(12) United States Patent
Lin

(10) Patent No.: US 8,030,872 B2
(45) Date of Patent: Oct. 4, 2011

(54) MOTOR CONTROLLER FOR A SUNSHADE ASSEMBLY

(75) Inventor: Paul Lin, Tainan Hsien (TW)

(73) Assignee: Macauto Industrial Co., Ltd., Yung-Kang, Tainan Hsien (TW)

( * ) Notice: Subject to any disclaimer, the term of this patent is extended or adjusted under 35 U.S.C. 154(b) by 209 days.

(21) Appl. No.: 12/539,961

(22) Filed: Aug. 12, 2009

(65) Prior Publication Data

US 2011/0036508 A1 Feb. 17, 2011

(51) Int. Cl.
*B60J 1/20* (2006.01)
*H02P 7/00* (2006.01)
*H02P 3/00* (2006.01)

(52) U.S. Cl. .............. 318/461; 318/446; 160/370.21; 160/370.22; 296/97.1

(58) Field of Classification Search .......... 318/446, 318/461, 468, 471; 160/370, 370.21, 370.22, 160/DIG. 2, DIG. 3, DIG. 4; 296/97.1, 97.8
See application file for complete search history.

(56) References Cited

U.S. PATENT DOCUMENTS

| 5,388,176 | A | * | 2/1995 | Dykstra et al. ............... 388/811 |
| 6,668,902 | B2 | * | 12/2003 | Bong ....................... 160/370.22 |
| 6,872,901 | B2 | * | 3/2005 | Su et al. ..................... 200/61.02 |
| 7,314,079 | B2 | * | 1/2008 | Yano et al. ............... 160/370.22 |
| 7,315,146 | B2 | * | 1/2008 | Bejean .......................... 318/468 |
| 7,673,925 | B2 | * | 3/2010 | Lin .............................. 296/97.4 |
| 2004/0160082 | A1 | * | 8/2004 | Bohm et al. ............... 296/97.11 |
| 2005/0189784 | A1 | * | 9/2005 | Guerreiro et al. ............ 296/152 |
| 2007/0029058 | A1 | * | 2/2007 | Lin ........................... 160/370.22 |
| 2008/0157559 | A1 | * | 7/2008 | Ercolano ...................... 296/152 |

* cited by examiner

*Primary Examiner* — Eduardo Colon
(74) *Attorney, Agent, or Firm* — Osha • Liang LLP

(57) ABSTRACT

A motor controller includes a signal-generating unit that is operable so as to control rotational direction and rotational speed of a motor of a sunshade assembly, and a processing unit that operates the signal-generating unit to rotate the motor in a reverse direction to thereby retract a flexible screen body of the sunshade assembly, and to generate a decelerating signal for progressively reducing the rotational speed of the motor during a final stage of retraction of the flexible screen body.

13 Claims, 5 Drawing Sheets

US 8,030,872 B2

MOTOR CONTROLLER FOR A SUNSHADE ASSEMBLY

BACKGROUND OF THE INVENTION

1. Field of the Invention

This invention relates to a motor controller, more particularly to a motor controller for a sunshade assembly.

2. Description of the Related Art

An electric sunshade assembly is generally employed for covering a windshield of an automobile. The conventional electric sunshade assembly includes a base, a flexible screen body, and a batten provided on a free end of the flexible screen body.

The aforementioned conventional electric sunshade assembly is disadvantageous in that when the flexible screen body is retracted, since the flexible screen body is retracted at a relatively high speed, a considerable noise is generated due to collision between the batten and the base, as illustrated in FIG. 3. Moreover, the conventional electric sunshade assembly is designed for use in a tropical or sub-tropical zone. As such, when the conventional electric sunshade assembly is used in frigid zones, the conventional electric sunshade assembly may operate abnormally or fail to operate.

SUMMARY OF THE INVENTION

Therefore, the main object of the present invention is to provide a motor controller for a sunshade assembly that can overcome the aforesaid drawbacks of the prior art.

According to the present invention, a motor controller for a sunshade assembly comprises a judging unit, a recording unit, a signal-generating unit, and a processing unit. The sunshade assembly includes a flexible screen body, a mechanism that is operable so as to extend or retract the flexible screen body, a motor for controlling the mechanism, a first manually actuated switch assigned with a function to extend the flexible screen body, and a second manually actuated switch assigned with a function to retract the flexible screen body. The judging unit is adapted to be coupled to the first and second manually actuated switches, and is operable so as to determine a currently actuated one of the first and second manually actuated switches, and so as to generate a function signal indicative of the function assigned to the currently actuated one of the first and second manually actuated switches determined thereby. The recording unit is coupled to the judging unit, and stores therein a function message indicative of the function assigned to a previously actuated one of the first and second manually actuated switches. The signal-generating unit is adapted to be coupled to the motor, and is operable so as to control rotational direction and rotational speed of the motor. The processing unit is coupled to the judging unit, the recording unit, and the signal-generating unit, and is operable so as to determine whether the function signal generated by the judging unit matches the function message stored in the recording unit. When it is determined that the function signal does not match the function message, the processing unit operates the signal-generating unit to rotate the motor in a direction based on the function assigned to the currently actuated one of the first and second manually actuated switches. The processing unit further operates the signal-generating unit to generate a decelerating signal for progressively reducing the rotational speed of the motor during a final stage of retraction of the flexible screen body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
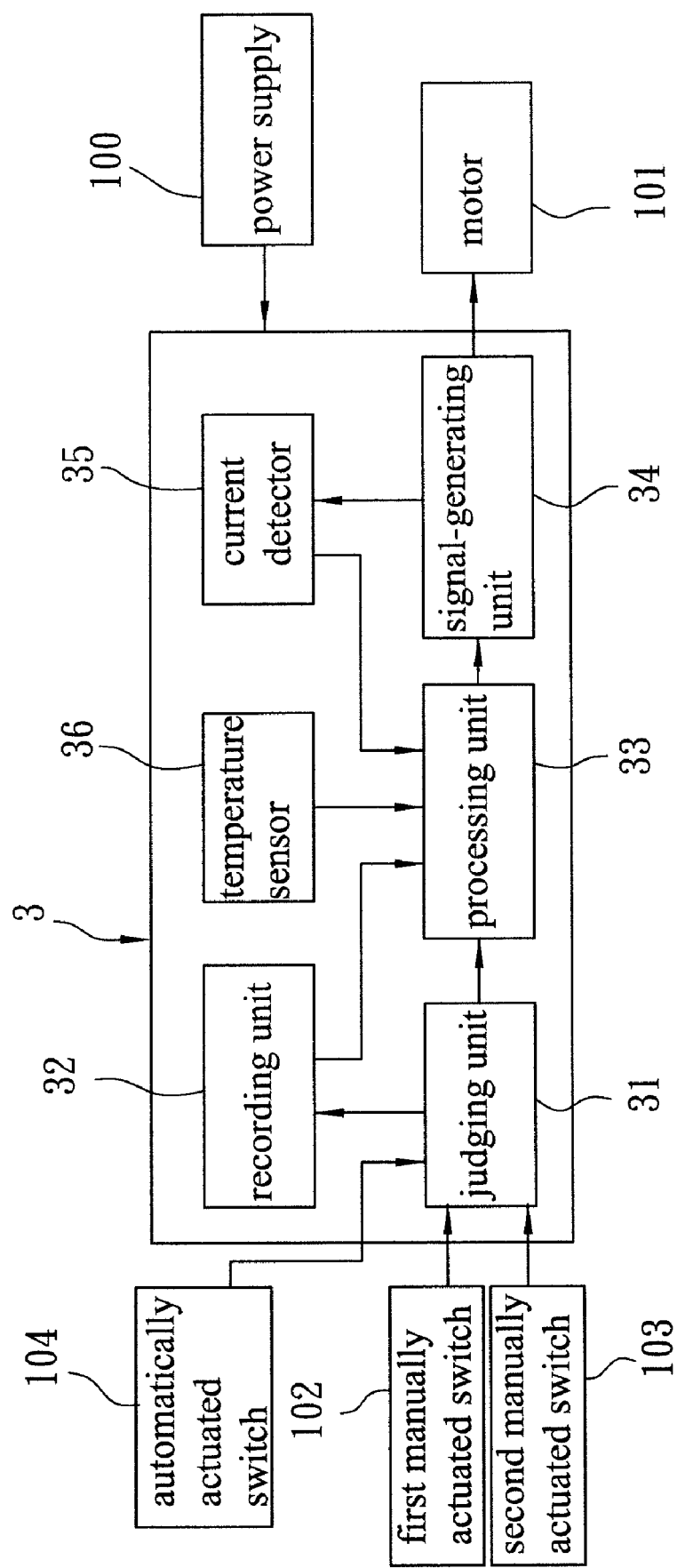
FIG. 1 is a circuit block diagram of the preferred embodiment of a motor controller according to this invention.

Referring to FIG. 1, the preferred embodiment of a motor controller 3 according to the present invention is shown to include a judging unit 31, a recording unit 32, a signal-generating unit 34, and a processing unit 33.

The motor controller 3 of this invention is mounted on a sunshade assembly.

The sunshade assembly is installed in an automobile (not shown), and includes a flexible screen body (not shown), a mechanism (not shown) that is operable so as to extend or retract the flexible screen body, a batten (not shown) provided on a free end of the flexible screen body, a motor 101 that drives operation of the mechanism, a first manually actuated switch 102 that is assigned with a function to extend the flexible screen body and that is actuated when pressed by a user (not shown), a second manually actuated switch 103 that is assigned with a function to retract the flexible screen body and that is actuated when pressed by the user (not shown), an automatically actuated switch 104 that is assigned with a function to retract the flexible screen body and that is actuated when a transmission of the automobile is shift to reverse, and a power supply 100 connected to the motor controller 3.

The judging unit 31 is connected to the first and second manually actuated switches 102, 103 and the automatically actuated switch 104, and is operable so as to determine a currently actuated one of the first and second manually actuated switches 102, 103 and the automatically actuated switch 104, and so as to generate a function signal indicative of the function assigned to the currently actuated one of the first and second manually actuated switches 102, 103 and the automatically actuated switch 104.

The recording unit 32 is connected to the judging unit 31, and stores therein a function message indicative of the function of a previously actuated one of the first and second manually actuated switches 102, 103 and the automatically actuated switch 104.

The signal-generating unit 34 is connected to the motor 101, and is operable so as to control rotational direction and rotational speed of the motor 101, in a manner that will be described hereinafter.

The processing unit 33 is connected to the judging unit 31, the recording unit 32, and the signal-generating unit 34, and is operable so as to determine whether the function signal generated by the judging unit 31 matches the function message stored in the recording unit 32. When it is determined that the function signal does not match the function message, the processing unit 33 operates the signal-generating unit 34 to rotate the motor 101 in a direction based on the function assigned to the currently actuated one of the first and second manually actuated switches 102, 103 and the automatically actuated switch 104. In this embodiment, the processing unit 33 operates the signal-generating unit 34 to generate an accelerating signal for progressively increasing the rotational speed of the motor 101, e.g., from zero to a predetermined value, during an initial stage of extension/retraction of the flexible screen body. Moreover, in this embodiment, the processing unit 33 operates the signal-generating unit 34 to generate a decelerating signal for progressively reducing the rotational speed of the motor 101, e.g., from the predetermined value back to zero, during a final stage of the extension/retraction of the flexible screen body. Further, in this embodiment, the processing unit 33 operates the signal-generating unit 34 to generate a constant signal for maintaining the rotational speed of the motor 101 constant, e.g., at the predetermined value, during an intermediate stage between the initial and final stages of the extension/retraction of the flexible screen body.

It is noted that signal-generating unit 34 is constituted by a plurality of metal oxide semiconductor field effect transistors (MOSFETs). The rotational speed of the motor 101 is controlled by varying a duty cycle of the signal-generating unit 34 to thereby adjust an operating effective current for driving the motor 101.

The motor controller 3 further includes a current detector 35 and a temperature sensor 36. The current detector 35 is connected to the signal-generating unit 34 and the processing unit 33, and is operable so as to detect an output current of the signal-generating unit 34, and so as to generate an output signal indicative of the output current detected thereby.

The processing unit 33 is further operable so as to determine whether the output signal generated by the current detector 35 exceeds a threshold value. When it is determined that the output signal generated by the current detector 35 exceeds the threshold value, the processing unit 33 stops operation of the signal-generating unit 34 and the motor controller 3, thereby preventing the motor 101 and the motor controller 3 from being damaged.

The temperature sensor 36 is connected to the processing unit 33, and is operable so as to detect the ambient temperature, and so as to generate an output signal indicative of the ambient temperature detected thereby.

The processing unit 33 is further operable so as to adjust an operating current of the motor controller 3 and the threshold value based on the output signal generated by the temperature sensor 36. The construction as such ensures normal operation of the motor controller 3 under different ambient temperatures.

Figure 2A:
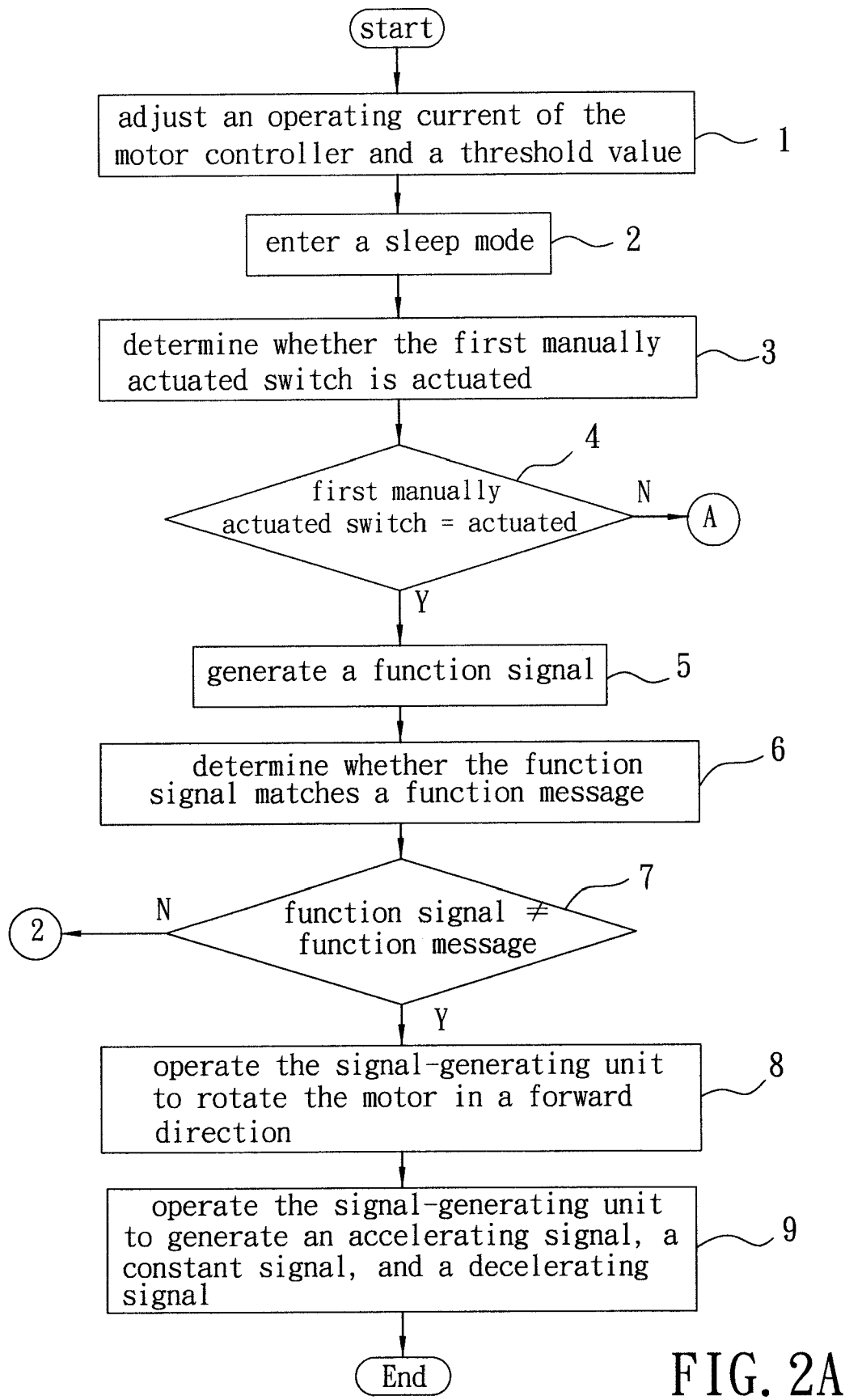
FIGS. 2A to 2C are flow charts of the preferred embodiment of a method according to this invention to be implemented using the motor controller shown in FIG. 1.
Figure 2B:
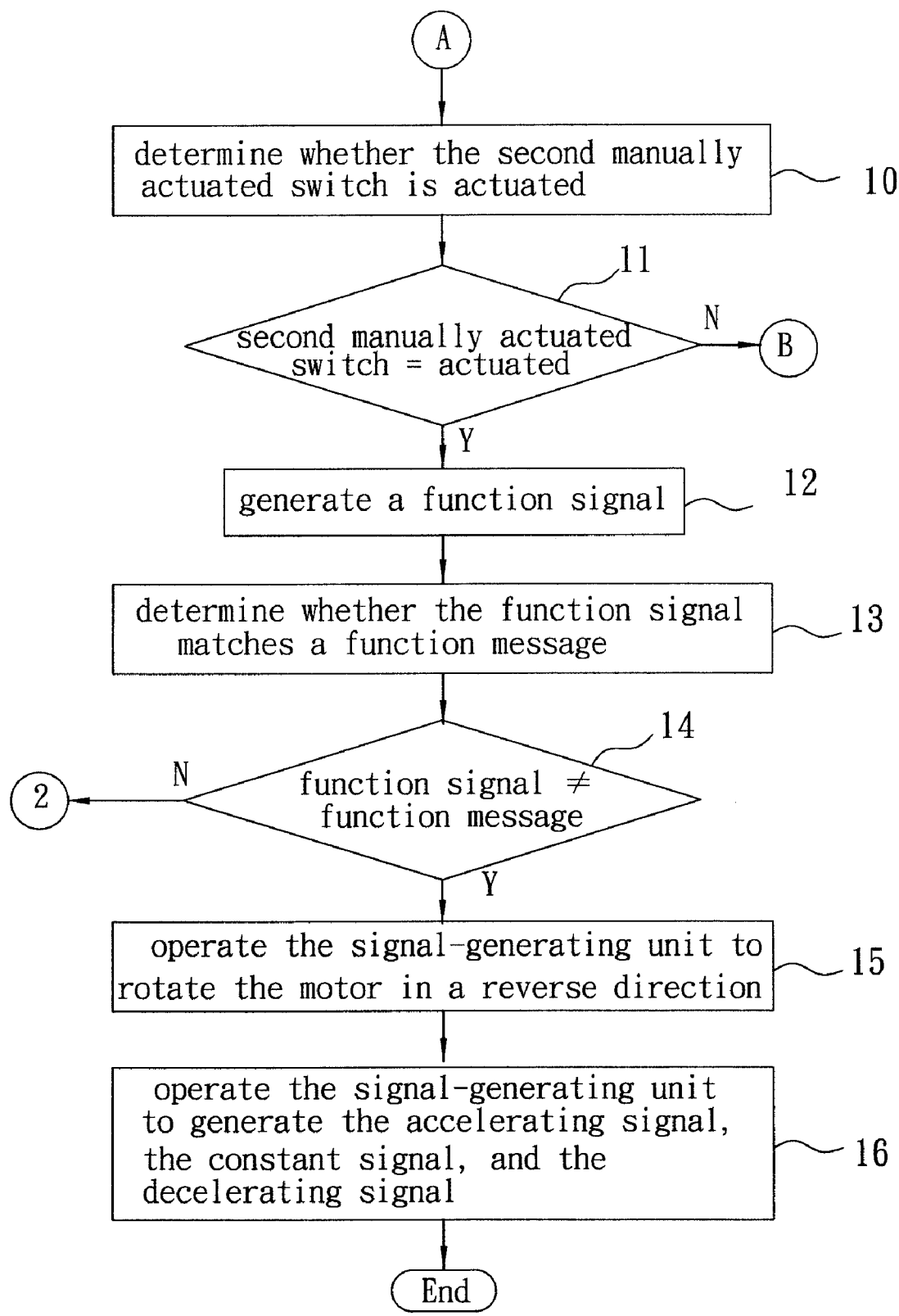
Figure 2C:
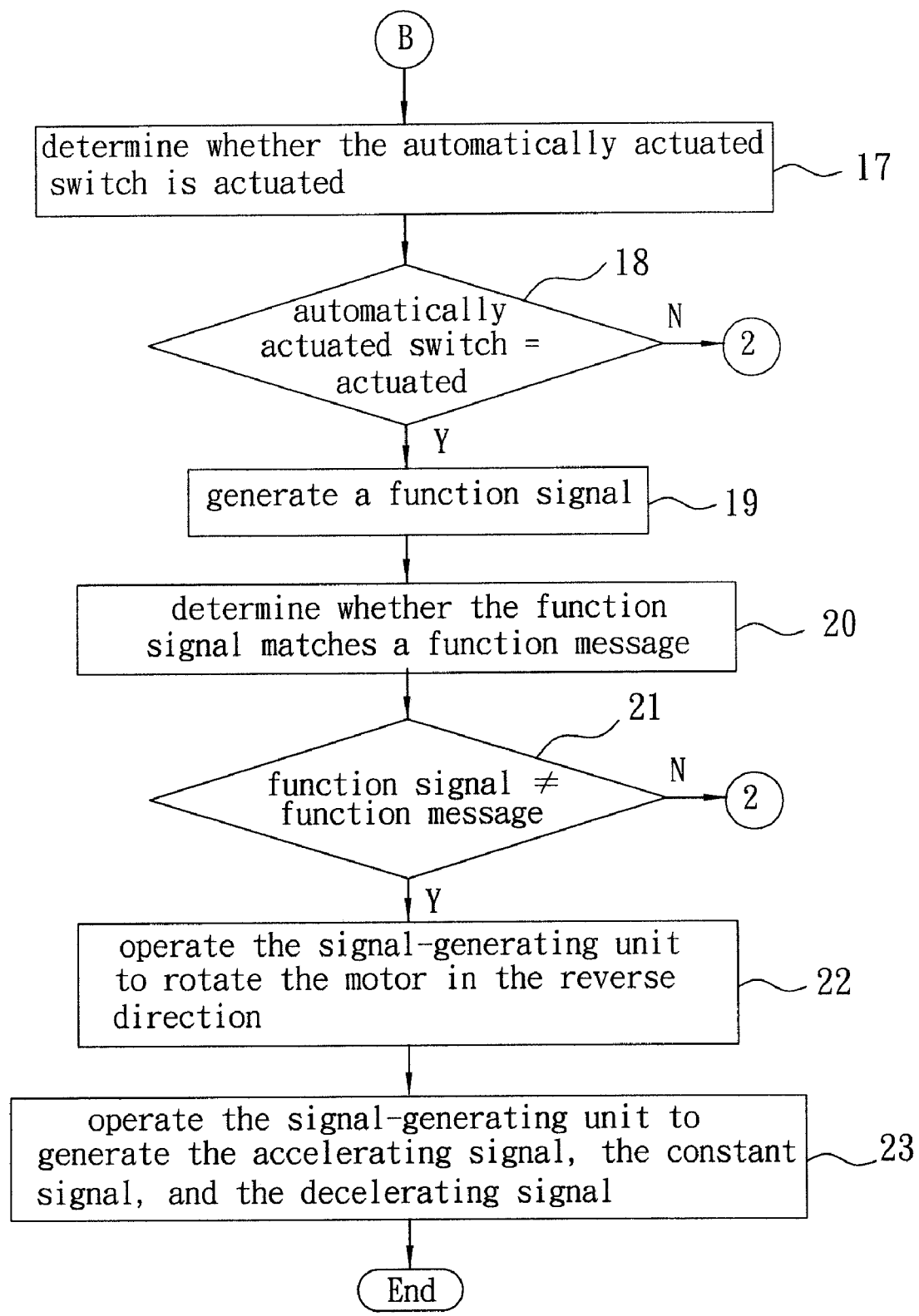

The preferred embodiment of a method to be implemented using the aforementioned motor controller 3 according to this invention will now be described with further reference to FIGS. 2A to 2C.

In step 1, the processing unit 33 adjusts the operating current of the motor controller 3 and the threshold value based on the output signal generated by the temperature sensor 36.

In step 2, the processing unit 33 enters a sleep mode.

In step 3, the judging unit 31 determines whether the first manually actuated switch 102 is actuated.

In step 4, when it is determined in step 3 that the first manually actuated switch 102 is actuated, the flow proceeds to step 5. Otherwise, the flow proceeds to step 10.

In step 5, the judging unit 31 generates a function signal indicative of the function assigned to the first manually actuated switch 102.

It is noted that the function signal generated in this step wakes the processing unit 33 up from the sleep mode.

In step 6, the processing unit 33 determines whether the function signal generated in step 5 matches the function message stored in the recording unit 32.

In step 7, when it is determined in step 6 that the function signal does not match the function message, which indicates that the flexible screen body is in a retracted state, the flow proceeds to step 8. Otherwise, i.e., the function signal matches the function message, which indicates that the flexible screen body is in an extended state, the flow goes back to step 2.

In step 8, the processing unit 33 operates the signal-generating unit 34 to rotate the motor 101 in a forward direction to thereby extend the flexible screen body.

In step 9, the processing unit 33 operates the signal-generating unit 34 to generate the accelerating signal, the constant signal, and the decelerating signal during the first twenty-five percent, the next fifty percent, and the last twenty-five percent, respectively, of the duration of the extension of the flexible screen body. Thereafter, the flow is terminated.

In step 10, the judging unit 31 determines whether the second manually actuated switch 103 is actuated.

In step 11, when it is determined in step 10 that the second manually actuated switch 103 is actuated, the flow proceeds to step 12. Otherwise, the flow proceeds to step 17.

In step 12, the judging unit 31 generates a function signal indicative of the function assigned to the second manually actuated switch 103.

It is noted that the function signal generated in this step wakes the processing unit 33 up from the sleep mode.

In step 13, the processing unit 33 determines whether the function signal generated in step 12 matches the function message stored in the recording unit 32.

In step 14, when it is determined in step 13 that the function signal does not match the function message, which indicates that the flexible screen body is in the extended state, the flow proceeds to step 13. Otherwise, i.e., the function signal matches the function message, which indicates that the flexible screen body is in the retracted state, the flow goes back to step 2.

In step 15, the processing unit 33 operates the signal-generating unit 34 to rotate the motor 101 in a reverse direction to thereby retract the flexible screen body.

In step 16, the processing unit 33 operates the signal-generating unit 34 to generate the accelerating signal, the constant signal, and the decelerating signal during the first twenty-five percent, the next fifty percent, and the last twenty-five percent, respectively, of the duration of the retraction of the flexible screen body. Thereafter, the flow is terminated.

In step 17, the judging unit 31 determines whether the automatically actuated switch 104 is actuated.

In step 18, when the judging unit 31 determines that the automatically actuated switch 104 is actuated, the flow proceeds to step 19. Otherwise, the flow goes back to step 2.

In step 19, the judging unit 31 generates a function signal indicative of the function assigned to the automatically actuated switch 104.

It is noted that the function signal generated in this step wakes the processing unit 33 up from the sleep mode.

In step 20, the processing unit 33 determines whether the function signal generated in step 19 matches the function message stored in the recording unit 32.

In step 21, when it is determined in step 20 that the function signal does not match the function message, which indicates that the flexible screen body is in the extended state, the flow proceeds to step 22. Otherwise, i.e., the function signal matches the function message, which indicates that the flexible screen body is in the retracted state, the flow goes back to step 2.

In step 22, the processing unit 33 operates the signal-generating unit 34 to rotate the motor 101 in the reverse direction to thereby retract the flexible screen body.

In step 23, the processing unit 33 operates the signal-generating unit 34 to generate the accelerating signal, the constant signal, and the decelerating signal during the first twenty-five percent, the next fifty percent, and the last twenty-five percent, respectively, of the duration of the retraction of the flexible screen body. Thereafter, the flow is terminated.

Figure 3:
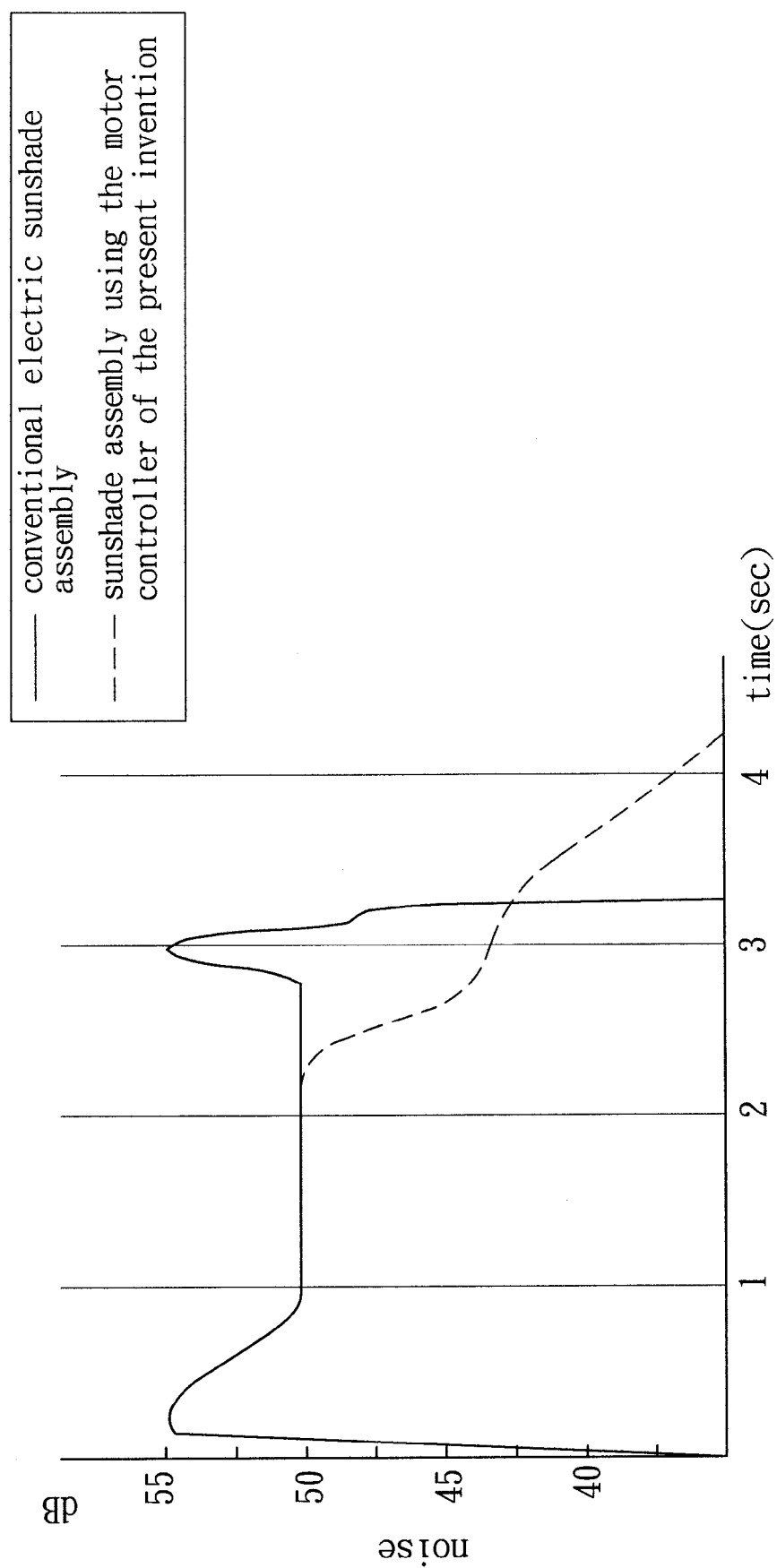
FIG. 3 is a plot illustrating noises generated during retraction of a conventional electric sunshade assembly and a sunshade assembly which uses the motor controller shown in FIG. 1.

From the above description, when the mechanism is operated to retract the flexible screen body, since the motor controller 3 of the present invention progressively reduces the rotational speed of the motor 101 the during the final stage of the retraction of the flexible screen body, noise generated due to collisions among the batten, the mechanism, and other components, such as a base, of the sunshade assembly is significantly suppressed, as illustrated in FIG. 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A motor controller for a sunshade assembly, the sunshade assembly including a flexible screen body, a mechanism that is operable so as to extend or retract the flexible screen body, a motor for controlling the mechanism, a first manually actuated switch assigned with a function to extend the flexible screen body, and a second manually actuated switch assigned with a function to retract the flexible screen body, said motor controller comprising:
   a judging unit adapted to be coupled to the first and second manually actuated switches, and operable so as to determine a currently actuated one of the first and second manually actuated switches, and so as to generate a function signal indicative of the function assigned to the currently actuated one of the first and second manually actuated switches determined thereby;
   a recording unit coupled to said judging unit, and storing therein a function message indicative of the function assigned to a previously actuated one of the first and second manually actuated switches;
   a signal-generating unit adapted to be coupled to the motor, and operable so as to control rotational direction and rotational speed of the motor; and
   a processing unit coupled to said judging unit, said recording unit, and said signal-generating unit, and operable so as to determine whether the function signal generated by said judging unit matches the function message stored in said recording unit,
   wherein when it is determined that the function signal does not match the function message, said processing unit operates said signal-generating unit to rotate the motor in a direction based on the function assigned to the currently actuated one of the first and second manually actuated switches, and
   wherein said processing unit further operates said signal-generating unit to generate a decelerating signal for progressively reducing the rotational speed of the motor during a final stage of retraction of the flexible screen body.

2. The motor controller as claimed in claim 1, wherein said processing unit operates said signal-generating unit to generate the decelerating signal during the last twenty-five percent of the duration of the retraction of the flexible screen body.

3. The motor controller as claimed in claim 1, wherein said processing unit further operates said signal-generating unit to generate an accelerating signal for progressively increasing the rotational speed of the motor during an initial stage of the retraction of the flexible screen body.

4. The motor controller as claimed in claim 3, wherein said processing unit operates said signal-generating unit to generate the accelerating signal during the first twenty-five percent of the duration of the retraction of the flexible screen body.

5. The motor controller as claimed in claim 3, wherein said processing unit further operates said signal-generating unit to generate a constant signal for maintaining the rotational speed of the motor constant during an intermediate stage, between the initial and the final stages, of the retraction of the flexible screen body.

6. The motor controller as claimed in claim 1, wherein said processing unit further operates said signal-generating unit to generate the decelerating signal during a final stage of extension of the flexible screen body.

7. The motor controller as claimed in claim 6, wherein said processing unit operates said signal-generating unit to generate the decelerating signal during the last twenty-five percent of the duration of the extension of the flexible screen body.

8. The motor controller as claimed in claim 6, wherein said processing unit further operates said signal-generating unit to generate an accelerating signal for progressively increasing the rotational speed of the motor during an initial stage of the extension of the flexible screen body.

9. The motor controller as claimed in claim 8, wherein said processing unit operates said signal-generating unit to generate the accelerating signal during the first twenty-five percent of the duration of the extension of the flexible screen body.

10. The motor controller as claimed in claim 8, wherein said processing unit further operates said signal-generating unit to generate a constant signal for maintaining the rotational speed of the motor constant during an intermediate stage, between the initial and the final stages, of the extension of the flexible screen body.

11. The motor controller as claimed in claim 1, wherein said judging unit is further adapted to be coupled to an automatically actuated switch of the sunshade assembly assigned with a function to retract the flexible screen body,
   said judging unit being operable so as to determine a currently actuated one of the first and second manually actuated switches and the automatically actuated switch,
   the function signal generated by said judging unit being indicative of the function assigned to the currently actuated one of the first and second manually actuated switches and the automatically actuated switch determined by said judging unit,
   the function message stored in said recording unit being indicative of the function assigned to a previously actuated one of the first and second manually actuated switches and the automatically actuated switch.

12. The motor controller as claimed in claim 1, wherein said processing unit stops operation of said signal-generating unit when an output current of said signal-generating unit exceeds a threshold value.

13. The motor controller as claimed in claim 12, further comprising a temperature sensor coupled to said processing unit, and operable so as to detect the ambient temperature, and so as to generate an output signal indicative of the ambient temperature detected thereby,
   wherein said processing unit adjusts an operating current of said motor controller and the threshold value based on the output signal generated by said temperature sensor.

* * * * *